(12) United States Patent
Herrmann

(10) Patent No.: US 7,767,325 B2
(45) Date of Patent: Aug. 3, 2010

(54) METHOD AND APPARATUS FOR THE INVESTIGATION OF A FUEL CELL SYSTEM

(75) Inventor: Manfred Herrmann, Ginsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1781 days.

(21) Appl. No.: 10/616,457

(22) Filed: Jul. 9, 2003

(65) Prior Publication Data
US 2004/0081864 A1   Apr. 29, 2004

(30) Foreign Application Priority Data
Jul. 10, 2002   (DE)   .............................. 102 31 208

(51) Int. Cl.
*H01M 8/00* (2006.01)
*H01M 8/04* (2006.01)
(52) U.S. Cl. .......................................... 429/13; 429/25
(58) Field of Classification Search .................. 429/13, 429/25
See application file for complete search history.

(56) References Cited

U.S. PATENT DOCUMENTS

| | | | | |
|---|---|---|---|---|
| 5,595,832 A | * | 1/1997 | Tomimatsu et al. | ........... 429/16 |
| 5,763,113 A | * | 6/1998 | Meltser et al. | ................. 429/13 |
| 6,156,447 A | * | 12/2000 | Bette et al. | ..................... 429/13 |
| 6,492,043 B1 | * | 12/2002 | Knights et al. | ................. 429/13 |
| 6,635,370 B2 | * | 10/2003 | Condit et al. | .................. 429/13 |
| 6,638,650 B1 | * | 10/2003 | Bailey et al. | ................... 429/13 |

* cited by examiner

*Primary Examiner*—Patrick Ryan
*Assistant Examiner*—Karie O'Neill Apicella
(74) *Attorney, Agent, or Firm*—Reising Ethington P.C.

(57) ABSTRACT

A method and an apparatus for the investigation of a fuel cell system comprising at least one fuel cell having an anode side to which a fuel is supplied in operation and a cathode side which is separated from the anode side by a membrane and to which an oxidizing agent is supplied in operation, in order to carry out at least one of the following tests: a) to test whether the fuel cell system is gas-tight at the anode side and/or at the cathode side, b) to test whether a leakage is present between the anode side and the cathode side of the fuel cell system, c) to test the starting behavior of the fuel cell system, d) to test the operation of the fuel cell system at low current yield. The respective test is carried out with a mixture of at least inert gas with at least one fuel permissible for the operation of the fuel cells, the mixture being supplied to the anode side of the fuel cell system. The mixture is so selected that the proportion of fuel lies below a value at which the mixture is flammable in air.

31 Claims, 1 Drawing Sheet

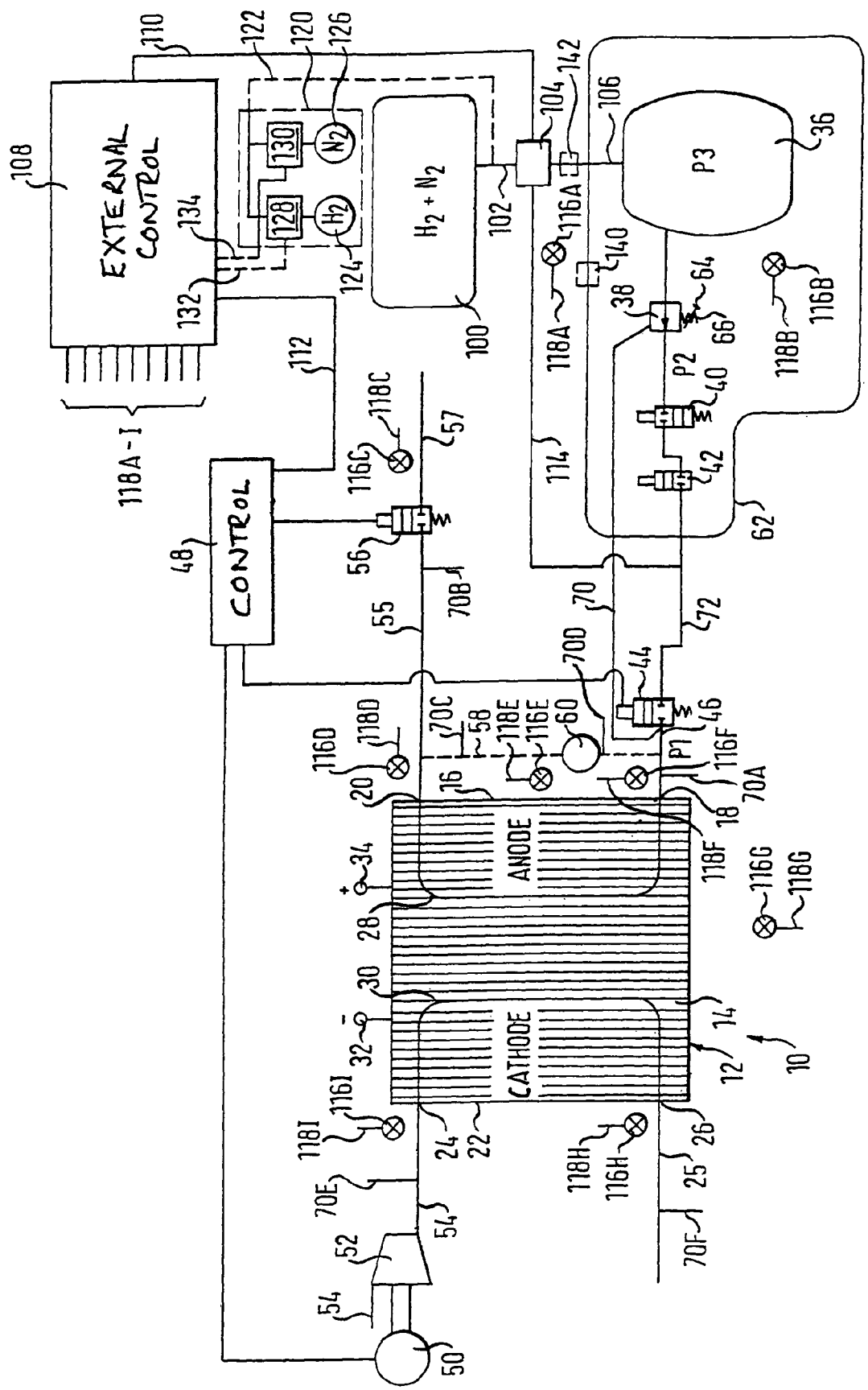

METHOD AND APPARATUS FOR THE INVESTIGATION OF A FUEL CELL SYSTEM

BACKGROUND OF THE INVENTION

The present invention relates to a method for the investigation of a fuel cell system, said fuel cell system having an anode side to which a fuel is supplied in operation and a cathode side to which an oxidizing agent is supplied in operation and comprising at least one fuel cell, each said fuel cell having a an anode, a cathode and a membrane separating said cathode from said anode, said method being adapted to carry out at least one of the following tests: a) to test whether said fuel cell system is gas-tight at said anode side and/or at said cathode side, b) to test whether a leakage is present between said anode side and said cathode side, c) to test a starting behaviour of said fuel cell system, or d) to test an operation of said fuel cell system at low current yield Furthermore the present invention relates to an apparatus for the investigation of a fuel cell system for the carrying out of one of the above-named tests.

The testing of a fuel cell system with regard to possible leakages, both when it is first switched on after completion of the fuel cell system and after a repair of a vehicle or of other devices has been carried out into which the fuel cell system is integrated, or with the first time operation of a vehicle or of an apparatus in which the fuel cell system is incorporated, and also during the development of a fuel cell system, requires a hydrogen source and also extensive tests. The testing with hydrogen requires very complicated measures in the testing chambers. For example such testing chambers must be equipped with ventilation systems which operate with a high through-put of air. Various hydrogen detectors and also additional switching off devices are required in order to detect any hydrogen leakages and, in the event a leakage is determined, to switch off the test chamber and also the entire installation present therein. Moreover all electrical systems which are to be found in the testing chambers must be particularly protected against spark formation in order to prevent hydrogen explosions. Only well educated, particularly schooled persons can and may operate in the corresponding test chambers under such conditions.

Even when such complicated measures have already been taken in test chambers during the development of fuel cell systems and vehicles and apparatus which contain such fuel cell systems, the mass manufacture of fuel cell systems or vehicles or other apparatus which contain such fuel cell systems can hardly be carried out with present measures and a particular problem also exists if, for example, a vehicle with a fuel cell system has in future to be repaired in a car repair shop.

For the present leakage testing of fuel cell systems helium is used in place of hydrogen because it has similar diffusion characteristics to the preferred fuel, i.e. hydrogen, is of relatively low viscosity and makes it possible to detect any leakages that are present with helium detectors. For tests which are concerned with the starting or the taking into operation of the fuel cell systems of vehicles or apparatuses with fuel cell systems, it is however necessary to test the system with hydrogen, whereby the above-mentioned complicated measures have to be taken in order to avoid the possibility of an explosive gas mixture in the case of an unintended hydrogen leakage.

SUMMARY OF THE INVENTION

The object of the present invention is to provide a method and an apparatus of the initially named kind which makes it possible to operate with hydrogen or other fuels and nevertheless to avoid with safety particularly complicated measures of a respective testing chamber, with it being possible for the work that is required to be carried out by less well educated or schooled persons.

In order to satisfy this object method-wise, provision is made in accordance with the invention that each said test is carried out with a mixture of at least one inert gas with at least fuel permissible for the operation of said fuel cell system, said mixture being supplied to said anode side of said fuel cell system and being selected such that a proportion of said fuel present in said mixture lies below a value at which said mixture is flammable in air.

Apparatus-wise the invention provides that the apparatus includes the following components: a device which delivers a mixture of at least one inert gas with at least one fuel permissible for the operation of the fuel cell(s), a connection line which leads from this device to an inlet at said anode side of the fuel cell(s) and a device which determines whether said mixture escapes in an impermissible manner.

The invention is based on the recognition that, for gas mixtures which consist of a combustible gas and an inert gas, there is always a mixture with a specific proportion of combustion gas which no longer counts as ignitable in air. In this respect reference is made to the ISO norm 10156. Furthermore the invention relates to the recognition that is possible to operate a fuel cell system with a corresponding gas mixture with a low proportion of fuel in the gas mixture and nevertheless to obtain a useful information concerning any leakages that are present or any power data of the fuel cell system.

The invention leads to a series of a advantages, amongst other things: the entire system can be checked for leakages in an environment which does not count as being protected against explosion, the fuel cell system can initially be operated with restricted power yield (electrical power yield) in an environment which does not count as being protected against explosion, no particular expense is necessary in order to modify existing test beds and chambers for vehicles in order to test fuel cell vehicles, the requirement for environments which are protected against explosions and which require a special starting provisions can be significantly reduced, the starting of fuel cell systems, or vehicles, or apparatus with fuel cell systems can largely be carried out by persons who do not require any special education with regard to environments endangered by hydrogen, hydrogen leakages can also be detected when using a gas mixture with inert gas, simply with the use of customary hydrogen sensors available on the market, unintended collections of hydrogen are avoided, a risk, which originates from the ignition of hydrogen is not present, even with serious fault sources such as bursting components which lead to an excessive release of the test gas mixture, the entire method is made substantially safer with corresponding advantages, a relatively cheap test gas can be used, whereby further cost savings are possible.

Only one type of gas, namely the gas mixture, has to be supplied to the system so that leakage tests and starting tests can be carried out with this one gas and indeed also at the same time, whereby cost savings can be achieved.

It can at most eventually be necessary to flush containers which belong to the fuel cell system, and which in normal operation serve for hydrogen storage at low temperatures, with an inert gas such as helium, or to prevent the test gas entering into this container.

It is particularly advantageous when the method is carried out with a gas mixture which contains nitrogen for the inert gas and hydrogen for the fuel, with the mixture containing less than 5.7 vol.-% or mol-% hydrogen and nitrogen. It is particularly favourable when forming gas having at least substantially 95% $N_2$ and 5% $H_2$ used as the mixture. Forming gas is already used during the manufacture of semiconductors and corresponding industrial systems and is thus obtainable at a favourable price.

The method is normally carried out in an environment with normal ventilation. The method can be carried out so that the tests a), b), c) and/or d) take place during the manufacture of a vehicle using the fuel cell system as a source of propulsion in order to test the operability of the vehicle at the time of manufacture. Furthermore, the method can be carried out in a workshop following the repair of a fuel cell vehicle, so that workshops which are equipped for the repair of cars with normal combustion engines can straightforwardly also repair fuel cell vehicles.

The method can however also be carried out at a point in time at which the fuel cell system is present as a module. Thus, it can already be carried out during the manufacture of the fuel cell system prior to the installation of the module in a vehicle or into another installation. The method can however also be carried out on a test bed during the development of the fuel cell system. If a plurality of fuel cells are connected together to form a fuel cell stack the test or the tests can be carried out on the fuel cell stack.

One possibility for carrying out the method of the invention and detecting leakages, in particular for carrying out the test a), consists of supplying the gas mixture with a predeterminable test pressure, which for example lies by a factor 2 above the intended operating pressure in the fuel cell system, through an inlet that is provided with simultaneous or previous or subsequent closing of all inlets and outlets out of which the escape of the gas mixture could be considered and to measure whether the test pressure drops impermissibly as a function of time.

The possibility also exists of feeding the gas mixture to the fuel cell system and measuring the fed-in quantity of gas, of switching all relevant valves which can be switched on and off and also all regulating valves in accordance with a predetermined pattern and/or in a predetermined sequence and of measuring the sum of the quantities of gas which emerge from the fuel cell system through the lines that are provided and comparing this with the quantity of gas fed-in order to determine any leakages which present themselves as a difference value. During these tests the temporal development of the difference value can be compared with a predetermined pattern in order to associate any leakages that are present with a source of leakage or with a plurality of sources of leakage. The method can also be carried out in such a way that the fuel cells are heated during the carrying out of the test, or prior to the carrying out of the test, to operating temperature or to a maximum permissible excess temperature. However, account is taken of the fact that leakages are more likely to be expected in operation when the fuel cell system has reached the operating temperature or exceeded it.

During the development of a fuel cell system at least one long term test can be carried out using the method. A long term test of this kind includes for example a plurality of switching on and switching off cycles of valves which can be switched on and switched off and also changes of set values of regulating valves. A long term test of this kind can also include a plurality of heating up and cooling down cycles of the fuel cell system, which for example simulate the continuing heating up and cooling down of the fuel cell systems in vehicles during the operation of the vehicles, since leakages are more likely to be expected as a result of the temperature cycles.

A particular variant of the method of the invention lies in developing an association between the electrical power generated by the fuel cell system when supplying a predetermined quantity of the gas mixture to the fuel cell system and the power yield of the same fuel cell system, or of a fuel cell system of the same kind, when supplying the quantity of fuel intended in operation at a preset operating point or at a plurality of preset operating points, with a check being made whether the power yield produced during this supply of the gas mixture corresponds to the expected power yield, from which a conclusion is drawn that in operation, with supply of the quantity of fuel provided, the desired electrical power can be expected at the preset operating point or at the preset operating points.

This type of test aims at supplying a predetermined quantity, i.e. weight, of the gas mixture, to the fuel cell system and allowing this to operate until this gas mixture has been completely used up or has been used up to a predetermined degree.

Another possibility of carrying out a similar test lies in developing an association is developed between the electrical power produced by the fuel cell system with the supply of a predetermined through-flow (mass flow) of the gas mixture to the fuel cell system and the power yield of the same fuel cell system, or of a fuel cell system of the same kind, when supplying the through-flow of fuel in operation at a preset operating point or at a plurality of intended operating points (continuous measurement), with a check being made whether the power yield produced during the supply of the gas mixture corresponds to the expected power yield, for which a conclusion is drawn that, in operation, with the supply of the preset quantity of fuel, the desired electrical power can be expected at the preset operating point or at the present operating points.

When carrying out these tests a different manner of operation can consciously be selected during the supply of the predetermined quantity of the gas mixture than in operation with the intended quantity of fuel for the corresponding working point. If, for example, a recirculation of the fuel supply is effected at the anode side during operation a recirculation of this kind can be dispensed with during the test. This variant takes account of the fact that the presence of the inert gas is in any event unfavourable for the testing of the power yield and, for example, in the case of recirculation, the concentration of the inert gas will increase as a result of the nitrogen which migrates from the cathode side of the fuel cell system to the anode side through the corresponding membranes. Through the avoidance of the recirculation during the testing of the fuel cell system this unfavourable development can be countered, since any nitrogen which diffuses from the cathode side to the anode can be led away with the exhaust gas flow of the anode side of the fuel cell system at the same time and thus can not lead to any increased nitrogen concentration.

Although the presence of the inert gas leads to a considerable reduction of the power yield of fuel cell system, correlations can nevertheless be created in course of the invention, i.e. the above mentioned associations, which enable conclusions to be drawn concerning the power of the fuel cell system in normal operation with normal fuel and the operation under test conditions which permit pronouncements to be made concerning the quality and operability of the tested fuel cell system in normal operation.

A further possibility in accordance with the invention for carrying out the method consists in increasing the proportion of fuel after having successfully concluded testing with the gas mixture and carrying out a renewed test, for example whether a higher power yield or the full power yield of the fuel cell system can be achieved without the inert gas component or with a significantly or progressively reduced inert gas component.

Another possibility of determining leakages lies in using at least one fuel sensor and/or inert gas sensor to determine any leakages of the gas mixture.

BRIEF DESCRIPTION OF THE DRAWINGS

Particularly preferred variants of the invention will now subsequently be described in more detail with reference to the accompanying drawing which shows in schematic form a fuel cell system 10 which is laid out in accordance with the invention.

DESCRIPTION OF THE PREFERRED EMBODIMENT

The reference numeral 12 indicates the fuel cell stack which consists of a plurality of individual fuel cells which are schematically designated 14. The fuel cell stack 12 has an anode side 16 with an anode inlet 18 and an anode outlet 20 and also a cathode side 22 with a cathode inlet 24 and a cathode outlet 26.

In manner known per se each individual fuel cell 14 has an anode, a cathode a membrane there between (not shown) with each so called MEA (Membrane Electrode Assembly) consisting of an anode, a cathode and a membrane arranged between them being held between two so-called bipolar plates (likewise not shown). Between the one bipolar plate and the cathode flow passages are provided for oxygen or atmospheric oxygen. Passages are likewise provided between the other bipolar plate and the anode which serve for the supply of hydrogen to the anode.

The flow passages at the anode side of the fuel cells are connected together, so that in operation all fuel cells can simultaneously be supplied with fuel via the anode inlet 18, with excess hydrogen and also other exhaust gases of the fuel cells, such as for example water in vapour form and nitrogen which originates from the atmospheric oxygen delivered to the cathode side being led out from the fuel cell stack at the anode outlet 20 via the line 55. The through-flow of the anodes of the interconnected fuel cells is schematically indicated in the drawing by the line 28. In similar manner the flow passages at the cathode side of the fuel cells are connected together in order to form a flow path 30 from the cathode inlet 24 to the cathode outlet 26 in the fuel cell stack 12, with the exhaust gases which arise at the cathode side 22 being discharged into the atmosphere via the line 25. The bipolar plates of the individual flow cells 14 are connected together in series and/or in parallel to one another. In operation a voltage arises at the two output terminals 32 and 34. This voltage is available as a power source for non-shown devices, for example for the propulsion of a motor vehicle in which the fuel cell system is incorporated and also the driving of other units, which are necessary for the operation of the fuel cell system.

The layout of fuel cell stacks and of the fuel cells contained therein are well known from diverse documents so that it is not necessary to enter here into more detail concerning the specific design of the fuel cell stack.

It is important that a gaseous fuel has to be supplied to the anode side 16 of the fuel cell stack 12 and, in the case of using hydrogen as a fuel, the hydrogen is taken from a source, here in form of a hydrogen tank 36. Specifically the hydrogen from the hydrogen tank 36 is supplied via a mechanical pressure regulating valve 38 and also via a solenoid operated switch-off valve 40 and a manually operatable shut-off valve 42 to a setting valve 44 which supplies the fresh hydrogen via a line 46 to the anode inlet 18 of the fuel cell stack 12. Instead of using a hydrogen tank 36 as a hydrogen source a hydrogen-rich synthetic gas from a reforming unit (not shown) can serve as a hydrogen source.

In operation, with the valves 40, 42 open, the setting valve 44 is controlled, depending on the power demanded by the driver of the motor vehicle, via a control 48 in order to feed the required mass flow of fresh hydrogen into the anode side of the fuel cell stack 12.

Simultaneously with the load dependent control of the setting valve 44 by the control 48, an electric motor 50 is controlled by the control 48 which drives a compressor 52 and feeds atmospheric oxygen via a line 54 and the cathode inlet 24 into the cathode side 22 of the fuel cell stack 12.

In the fuel cell stack 12 protons, which are delivered by the hydrogen that is supplied, migrate from the anode side 16 of the individual fuel cells through the membrane to the cathode side 22 and react at catalysts provided there with the atmospheric oxygen that is supplied to form water. This reaction leads to the electrical voltages arising at the bipolar plates which in summed form provide the power which can tapped off at the terminals 32 and 34.

During the electrochemical reaction in the individual fuel cells nitrogen molecules diffuse from the cathode side to the anode side and leave the anode side 16 via the anode outlet 20 together with the unconsumed hydrogen and water vapour. These anode exhaust gases can be continuously discharged via an anode exhaust valve 56. They are then normally supplied via a line 57 to a catalytic burner (not shown) for heat recovery and reacted there with atmospheric oxygen for the production of heat, with it being possible to discharge the exhaust gases present after the burner, which consist of nitrogen and water vapour into the atmosphere without reservation. The anode gases can also be supplied to a reforming unit and can be exploited for the reduction of heat if such a reforming unit is used. The anode exhaust gas valve 56 can however also be opened discontinuously in order to discharge exhaust gases from the fuel cell stack 12 from time to time, for example when the nitrogen concentration at the anode side of the fuel cell stack 12 has arisen to a level at which the efficient operation of the fuel cell stack would suffer. It is also known to supply the anode exhaust gases to the cathode side of the fuel cell stack 12 so that the hydrogen component reacts directly at the cathode side with oxygen to form water and can in this way be disposed off, with the present invention also being usable with such a system.

However, the possibility also exists of providing a return line between the anode outlet 20 and the anode inlet 18 and indeed with a pump 60 which ensures that the return gases have an adapted pressure level at the anode inlet 18 in order to maintain the flow. When using such a return circulation a proportion of the anode exhaust gases can also be either continuously or discontinuously discharged via the anode exhaust gas valve 56 and the line 57.

In the FIGURE the hydrogen tank 36, the mechanical pressure regulating valve 38, the solenoid actuated switch-off valve 40 and also the manually actuatable shut-off valve 42 are shown in a frame 62. Because this part is frequently delivered by specialist suppliers it is known per se.

The mechanical pressure regulating valve 38 ensures that the higher pressure level P3 in the hydrogen tank 36, which can for example lie at 350 bar can be regulated down to a lower pressure level P2, which for example can lie at only some what above 1 bar.

With such a mechanical pressure regulating valve a spring 66 which exerts a force on a piston is biased via an adjusting spring 64. The piston for example drives a valve member which cooperates with a counterpiece or a valve seat (not shown) in the mechanical pressure regulating valve and exerts the actual regulating function. Such mechanical pressure regulating valves normally have a connection to atmosphere which serves as the reference pressure.

In some systems 62, such as are obtained from the supplier, a second mechanical pressure regulating valve is provided at the tank side of the pressure regulating valve in series with the mechanical pressure regulating valve 38 shown here, because it is difficult to reduce the pressure P3 from approximately 350 bar to somewhat over 1 bar with a mechanical pressure regulating valve. If a second mechanical pressure regulating valve is present, provision is also made for a control line to lead from the output side of the mechanical pressure regulating valve 38 to the reference inlet of the second pressure regulating valve.

In this example a control line 70 leads from the outlet side of the setting valve 44 to the reference pressure input of the pressure regulating valve 38 so that when the pressure drops at the fuel cell side of the setting valve 44 the reference pressures at the mechanical pressure regulating valve 38 likewise drops. Because the force from the reference inlet operates in the same direction as the spring this leads to the outlet pressure P2 of the mechanical pressure regulating valve 38 dropping and thus the pressure at the inlet side of the setting valve 44 likewise drops, whereby the pressure difference at the setting valve 44, between its input side and its output side becomes smaller. In this way the range of pressure difference which has to be controlled by the setting valve 44 can always be kept small which reduces the demands placed on the setting valve 44. This does not signify that the pressure difference itself must be small but rather the fluctuations of the pressure difference should always be kept small.

In the operating mode, with the electromagnetically actuatable switch-off valve 40 and the shut-off valve 42 open the anodes of the fuel cells demand hydrogen gas depending on the load requirement. This hydrogen gas flow is set by the valve 44.

Alternatively, the control line 70 of the pressure regulating valve 38 can also be connected to any desired point at the cathode side of the fuel cell system. The precondition for this is that the pressure level of the cathode changes in the same phase with the anode, i.e. the pressure difference between the cathode and the anode remains constant apart from the sensor error.

Various possibilities for connecting the control line 70 to the fuel cell system are designated by the stub lines which are designated with the reference numerals 70A, 70B, 70C, 70D, 70E and 70F.

For the purpose of the present invention a source of a gas mixture of $H_2$ and $N_2$ is provided in the form of a tank system 100, in addition to the hydrogen source. The tank system 100 is connected via a line 102, a controllable regulating valve 104 with a switch-on/switch-off function and also a further line 106 to the hydrogen tank 36. The valve 104 can be controlled from an external control 108 and indeed via the line 110. The external control 108 is connected to the internal control 48 of the fuel cell system via a line 112 so that the fuel cell system can be mounted on a test bed or incorporated into a vehicle or into another apparatus and can be examined using the functions controlled by the control 48. The external control can take the form of a computer equipped with appropriate programs.

The line 114 which leads from the valve 104 to the line 72 is an alternative possibility of feeding the test gas mixture from the tank 100 into the fuel cell system, i.e. the line 114 represents an alternative to the line 106. The line could also be connected downstream of the valve 44 or at other points to the anode side of a fuel cell system to the latter.

In the box 120 shown in broken lines an alternative is shown for the delivery of a gas mixture via a line 122 to the valve 104. In the box 120 hydrogen and nitrogen sources 124, 126 are namely provided with respective valves 128, 130 in the form of regulating valves with switch-on and switch-off function which can be controlled via control lines 132, 134 from the external control 108 in order to generate the desired gas mixture of $H_2$ and $N_2$. This gas mixture is then supplied via the line 102 to the valve 104 instead of the supply from the tank system 100. The example shown in the box 120 has the special advantage that one can first of all set to the gas mixture so that it has a fuel component $H_2$ of, for example, 5% and a nitrogen component $N_2$ of 95% and thus lies below the ignition limit for this mixture in air. When the leakage tests have been concluded and it has then been found that leakages need no longer be feared the mixture can be changed step-wise or continuously in order to test the fuel cell system with gas mixtures which lie above the ignition limit.

Hydrogen detectors 116a to 116i are furthermore shown in the drawing which have respective connections 118a to 118i which are connected to the external control 108. Thus the sensor 116A can detect hydrogen leakages in the region of the valve 104 of the tank system 100 or of the mixing system 120. The sensor 116B can detect hydrogen leakages in the region of the hydrogen tank 36 if this is filled prior to the filling with hydrogen via the line 106 with the gas mixture from the tank system 100 or from the mixing system 120. The sensor 116C can detect leakages in the region of the discharge valve 56 when this closed or opened. The sensor 116D is arranged at the cathode outlet 20 of the fuel cell stack 12 and can detect leakages which occur there. Furthermore the sensor 116E can detect leakages in the general region of the anode side 16 of the fuel cell stack and also in the region of the recirculation pump 60. The sensor 116F can detect hydrogen leakages in the region of the anode inlet 18 or in the region of the regulating valve 44. The sensor 116G is positioned so that it can detect leakages in the general region of the fuel cell stack 12. The sensor 116H can detect hydrogen which eventually emerges at the cathode outlet, if such hydrogen seeps through from the anode side to the cathode side as a result of an internal leakage or of a defect membrane. Correspondingly the sensor 116I can detect hydrogen leakages which lead to hydrogen escape at the cathode inlet 24. The sensors which have been named are merely given as an example. Further or fewer sensors can be provided depending on the requirements at strategic points. The sensors named or further sensors can also be designed for the detection of inert gas leakages, in particular when an inert gas other than nitrogen is used. The use of sensors for nitrogen would be problematic because the environmental air consist of about 80% nitrogen.

The carrying out of the test is controlled by the external control 108. For example the external control 108 can introduce the gas mixture into the hydrogen tank 36 via the control line 110 and via the control lines 132 and 134 and the valve 104, or into the anode side of the fuel cell system via the lines 114, 72. In this arrangement all other valves in the system, such as for example the valve 56 can be closed via the coupling 112 to the control 48 so that the fuel cell system counts as switched off, apart from the opening of the valve 44 which is necessary to fill the test mixture into the anode side of the fuel cell system. Thereafter the valve 44 can also be closed and one can see whether the test pressure which has been set drops off impermissibly with time, for example via a non-illustrated pressure sensor which is likewise connected to the external control 108. In order to sensibly carry out this test it is under some circumstances appropriate to provide valves at the cathode side of the fuel cell stack 12 so that the inlets and outlets there can be closed. Another possibility of detecting the leakage lies in evaluating the sensor signals at the sensors 116A to 116I which can be carried out by the external control 108. A further possibility lies in holding one or more sensors manually at all points to be detected.

In a long term test the various valves that are provided can be opened and closed in a predetermined sequence or in accordance with a predetermined pattern in order to test different leakage paths individually or to detect them from the signal pattern that arises from the sensors. At this point expression should be given to the fact that the valves shown simply represent a selection of the valves that are normally provided and all such valves are normally connected via corresponding control lines to the control 48.

The possibility furthermore exists of detecting the power yield via the terminals 32 and 34 by the external control (this would then be connected via the control 48 to the electrical components, which take care of the preparation and distribution of the power tapped off at the terminals 32 and 34). That is to say the possibility exists of testing the fuel cell system when it is taken into operation, whereby leakages which then occur are detected by the sensors 116A to 116I and can be evaluated by the external control 108. If the taking into operation proves to be problem-free then it is possible to operate with a higher through-flow of the gas mixture to see whether the fuel cell system supplies the power which is to be expected with the gas mixtures that have been set and then conclusions can be drawn via the previously mentioned associations, which are, for example, stored in the external control 108, as to whether the fuel cell system can be operated in normal operation. For such tests, when a recirculation is provided in normal operation via a recirculation pump 60, it can be sensible to stop the recirculation through a corresponding valve in the line 58 or to permit the pump 60, which is likewise controlled from the control 48, to operate with a through-put different to that in normal operation. Furthermore the possibility also exists of heating up the fuel cell system either by an external heating device (not shown) or by the operation with the gas mixture in order to carry out the tests also in the heated state of the fuel cell system.

Providing the leakage testing and the operation with the gas mixture has been satisfactorily concluded it is possible, using the gas mixture supply device 120 to control the gas mixture step-wise or progressively through control signals of the external control 108 in the direction of a mixture which consists of a higher proportion of $H_2$, or which consists fully of $H_2$ in order to effect a subsequent power check.

Should the sensors 116A to 116I show that a hydrogen leakage is present during the tests that have been carried out, then the external control 108 must immediately terminate the hydrogen supply via the valve 104 in order to prevent unnecessary quantities of the gas mixture emerging. The fuel cell system must then be correspondingly checked over before a renewed test takes place or must indeed be classified as inoperable and scraped.

With tests in repair work shops it is not necessary to carry out the same test as on the test bed in the manufacturer's works. One can however carry out tests in a workshop which appear sensible there.

Since the external control 108 determines the setting and opening time of a valve 104 and/or the valve 128, 130, the through-flow of the gas mixture can be determined by the control, with a separate through-flow measuring device being provided if necessary, as is indicated at 140 in the line 114 or 142 in the line 106 in broken lines, with the through-flow measuring device 140 or 142 being connected to the external control 108.

A through-flow measuring device 140 or 142 of this kind is useful during the leakage testing. One can namely fill up the fuel cell system up to a determined test pressure and then measure with the through-flow measuring device 140 or 142 whether test gas continues to flow in order to maintain the test pressure at the level which has been set. If the cathode side of the fuel cell system is open, i.e. not closed by means of valves, then a through-flow of the test gas arises as result of diffusion through the membrane. The level of this through-flow should not exceed a characteristic value for the fuel cell system. This signifies however that if this value is exceeded a defect is present. When the cathode side is closed off, the through-flow measured should go to zero if no leakages are present. The test pressure may not be so high that the membranes are damaged. With the cathode side closed off the test gas can likewise be supplied to the cathode side. There would then be no pressure difference over the membranes which could damage them. In this case the through-flow measuring device 140 or 142 should show no through-flow when the test pressure is reached. The test can however also be carried out in two stages. I.e. the test gas can be supplied to the anode side at a low test pressure and the through-flow can be measured via the through-flow measuring device 140 and 142 respectively. If the through-flow lies in the permissible range, as a result of the diffusion through the membranes, the cathode side can be closed off and likewise be supplied with the test gas until the same or a higher test pressure is achieved at the anode side and cathode side. A check is then made to see if there is any through-flow which can be measured with the through-flow measuring device 140 or 142, which should then be zero.

It would also be possible to provide corresponding through-flow measuring devices at the inlets and outlets of the fuel cell system in order to determine by sum and difference formation whether the flows of the gas mixture which emerge correspond to the mass flow which enters or whether differences are present which permit a conclusion to be drawn concerning leakages.

The invention claimed is:

1. A method for the investigation of a fuel cell system, said fuel cell system having an anode side to which a fuel is supplied in operation and a cathode side to which an oxidizing agent is supplied in operation and comprising at least one fuel cell, each said fuel cell having an anode, a cathode and a membrane separating said cathode from said anode, said method comprising a first test comprising at least one of the following tests:
   a) to test whether said fuel cell system is gas-tight at said anode side and/or at said cathode side,
   b) to test whether a leakage is present, between said anode side and said cathode side,
   c) to test a starting behaviour of said fuel cell system, or
   d) to test an operation of said fuel cell system at low current yield,
      said first test being carried out with a mixture of at least one inert gas with a fuel permissible for the operation of said fuel cell system, said mixture being supplied to said anode side of said fuel cell system and the amount of fuel in the mixture being predetermined such that a proportion of said fuel present in said mixture lies below a value at which said mixture is flammable in air, and wherein said tests are conducted outside of a test chamber, wherein the mixture consists essentially of 95% $N_2$ and 5% $H_2$.

2. A method in accordance with claim 1, wherein said mixture includes less than 5.7 vol.-% hydrogen.

3. A method for the investigation of a fuel cell system, said fuel cell system having an anode side to which a fuel is supplied in operation and a cathode side to which an oxidizing agent is supplied in operation and comprising at least one fuel cell, each said fuel cell having an anode, a cathode and a membrane separating said cathode from said anode, said method comprising a first test comprising at least one of the following tests:
   a) to test whether said fuel cell system is gas-tight at said anode side and/or at said cathode side,
   b) to test whether a leakage is present between said anode side and said cathode side,
   c) to test a starting behaviour of said fuel cell system, or
   d) to test an operation of said fuel cell system at low current yield,
   said first test being carried out with a mixture of at least one inert gas with a fuel permissible for the operation of said fuel cell system, said mixture being supplied to said anode side of said fuel cell system and the amount of fuel in the mixture being predetermined such that a proportion of said fuel present in said mixture lies below a value at which said mixture is flammable in air, and wherein said tests are conducted outside of a test chamber, wherein the mixture consists essentially of 95% $N_2$ and 5% $H_2$, wherein the first test is carried out in an environment with a normal air atmosphere.

4. A method in accordance with claim 3, wherein the first test is carried out in an environment with normal ventilation.

5. A method in accordance with claim 3, wherein at least one of said tests a), b), c) or d) is carried out during or after manufacture of a vehicle incorporating said fuel cell system as a source of propulsion in order to test operability of said vehicle at a time of manufacture.

6. A method in accordance with claim 3, wherein the first test is carried out in a workshop after repair of a vehicle containing said fuel cell system.

7. A method for the investigation of a fuel cell system, said fuel cell system having an anode side to which a fuel is supplied in operation and a cathode side to which an oxidizing agent is supplied in operation and comprising at least one fuel cell, each said fuel cell having an anode, a cathode and a membrane separating said cathode from said anode, said method comprising a first test comprising at least one of the following tests:
   a) to test whether said fuel cell system is gas-tight at said anode side and/or at said cathode side,
   b) to test whether a leakage is present between said anode side and said cathode side,
   c) to test a starting behaviour of said fuel cell system, or
   d) to test an operation of said fuel cell system at low current yield,
   said first test being carried out with a mixture of at least one inert gas with a fuel permissible for the operation of said fuel cell system, said mixture being supplied to said anode side of said fuel cell system and the amount of fuel in the mixture being predetermined such that a proportion of said fuel present in said mixture lies below a value at which said mixture is flammable in air, and wherein said tests are conducted outside of a test chamber, wherein the mixture consists essentially of 95% $N_2$ and 5% $H_2$, in which said fuel cell system is present as a module, at least one of said tests a), b), c) or d) being carried out during or after the manufacture of said module prior to the installation of said module in one of a vehicle and an installation.

8. A method in accordance with claim 3, at least one of said tests a), b), c) or d) being carried out on a test bed during development of said fuel cell system.

9. A method in accordance with claim 3, wherein a plurality of fuel cells are combined together to form said fuel cell system in the form of a fuel cell stack and at least one of said first test a), b), c) or d) is carried out at said fuel cell stack.

10. A method in accordance with claim 3, wherein said fuel cell system comprising at least first and second inlets and at least first and second outlets wherein, during the carrying out of the first test a), said mixture is filled at a predetermined test pressure into said fuel cell system through one of said inlets and outlets, with simultaneous, previous or subsequent closing of further ones of said inlets and said outlets out of which an exit of said mixture could take place and wherein a measurement is made whether said test pressure reduces impermissibly as a function of time.

11. A method in accordance with claim 10 wherein said predetermined test pressure is approximately twice the operating pressure of the fuel cell.

12. A method in accordance with claim 1, wherein said fuel cell system comprising at least first and second inlets and at least first and second outlets as well as a plurality of valves at least one of which is associated with each said inlet and outlet, there being lines communicating with said valves, wherein a quantity of said mixture is fed into said fuel cell system, said quantity of said mixture is measured, said valves are switched on or off in accordance with at least one of a predetermined pattern and a predetermined sequence, a measurement is made of a quantity of said mixture emerging from at least some of said lines, a sum is formed of said emerging quantities and is compared with said fed-in quantity to determine any leakages, which appear as a difference value.

13. A method in accordance with claim 12 wherein at least one said valve is a regulatable valve which can be switched on and off.

14. A method in accordance with claim 12, wherein a development in time of said difference value is compared with said predetermined pattern in order to associate any eventually present leakage with a leakage source or a plurality of leakage sources.

15. A method in accordance with claim 3, wherein said fuel cell system is heated to one of an operating temperature and a maximum permissible excess temperature during the carrying out of any one of said tests.

16. A method in accordance with claim 3, wherein said fuel cell system is heated to one of an operating temperature and a maximum permissible excess temperature prior to the carrying out of any one of said tests.

17. A method in accordance with claim 3, wherein, during development of said fuel cell system, at least one of said tests is carried out as a long term test.

18. A method in accordance with claim 17, said fuel cell system including a plurality of valves which can be switched on and off wherein said long term test includes a plurality of switching on or switching off processes of said valves which can be switched on and off.

19. A method in accordance with claim 18, said fuel cell system further including at least one regulating valve having at least one set value, wherein said long term test also includes changes of said set value.

20. A method in accordance with claim 17, wherein said long term test includes a plurality of heating up and cooling down cycles of said fuel cell system.

21. A method for the investigation of a fuel cell system, said fuel cell system having an anode side to which a fuel is supplied in operation and a cathode side to which an oxidizing agent is supplied in operation and comprising at least one fuel cell, each said fuel cell having an anode, a cathode and a membrane separating said cathode from said anode, said method comprising a first test comprising at least one of the following tests:
  a) to test whether said fuel cell system is gas-tight at said anode side and/or at said cathode side,
  b) to test whether a leakage is present between said anode side and said cathode side,
  c) to test a starting behaviour of said fuel cell system, or
  d) to test an operation of said fuel cell system at low current yield,
    said first test being carried out with a mixture of at least one inert gas with a fuel permissible for the operation of said fuel cell system, said mixture being supplied to said anode side of said fuel cell system and the amount of fuel in the mixture being predetermined such that a proportion of said fuel present in said mixture lies below a value at which said mixture is flammable in air, and wherein said tests are conducted outside of a test chamber, wherein the mixture consists essentially of 95% $N_2$, and 5% $H_2$, wherein an association is developed between an electrical power generated by said fuel cell system when supplying a predetermined quantity of said mixture to said fuel cell system and an actual power yield of said fuel cell system when supplying an actual quantity of fuel in operation at least one preset operating point, with a check being made whether said electrical power generated during said supply of said predetermined quantity of said mixture corresponds to an expected power yield for said predetermined quantity of said mixture, from which a conclusion is drawn whether, in operation, with supply of said actual quantity of fuel, said actual power yield can be expected at said at least one preset operating point.

22. A method in accordance with claim 3, wherein an association is developed between an electrical power generated by said fuel cell system when supplying a predetermined quantity of said mixture to said fuel cell system and an actual power yield of another fuel cell system of the same kind when supplying an actual quantity of fuel in operation at least one present operating point, with a check being made whether said electrical power generated during said supply of said predetermined quantity of said mixture corresponds to an expected power yield for said predetermined quantity of said mixture, from which a conclusion is drawn whether, in operation, with supply of said actual quantity of fuel, said actual power yield an be expected at said at least one preset operating point.

23. A method in accordance with claim 21, wherein said association is examined for various supplied quantities of said mixture and an investigation is made whether corresponding values of said electrical power generated permit a conclusion that said fuel cell system will work in operation at corresponding operating points with different actual quantities of fuel being supplied.

24. A method in accordance with claim 22, wherein said association is examined for various supplied quantities of said mixture and an investigation is made whether corresponding values of said electrical power generated permit a conclusion that said fuel cell system will work in operation at corresponding operating points with different actual quantities of fuel being supplied.

25. A method in accordance with claim 3, wherein, after a successfully concluded test with said mixture a proportion of fuel in said mixture is increased and a second test is carried out in the same manner as the first test.

26. A method in accordance with claim 25, wherein said second test is carried out to determine whether a higher power yield of the fuel cell system can be achieved with a significantly reduced proportion of inert gas in said mixture.

27. A method in accordance with claim 25, wherein said second test is carried out to determine whether a full power yield of said fuel cell system can be achieved with a degenerated mixture without inert gas.

28. A method in accordance with claim 1, wherein at least one of a fuel sensor and an inert gas sensor is used in order to determine any leakages of said mixture.

29. A method for the investigation of a fuel cell system, said fuel cell system having an anode side to which a fuel is supplied in operation and a cathode side to which an oxidizing agent is supplied in operation and comprising at least one fuel cell, each said fuel cell having an anode, a cathode and a membrane separating said cathode from said anode, said method comprising a first test comprising at least one of the following tests:
  a) to test whether said fuel cell system is gas-tight at said anode side and/or at said cathode side,
  b) to test whether a leakage is present between said anode side and said cathode side,
  c) to test a starting behaviour of said fuel cell system, or
  d) to test an operation of said fuel cell system at low current yield,
    said first test being carried out with a mixture of at least one inert gas with a fuel permissible for the operation of said fuel cell system, said mixture being supplied to said anode side of said fuel cell system and the amount of fuel in the mixture being predetermined such that a proportion of said fuel present in said mixture lies below a value at which said mixture is flammable in air, and wherein said tests are conducted outside of a test chamber, wherein the mixture consists essentially of 95% $N_2$ and 5% $H_2$, wherein the inert gas comprises nitrogen and the fuel comprises hydrogen; and further comprising supplying said mixture from a mixture tank.

30. A method for the investigation of a fuel cell system, said fuel cell system having an anode side to which a fuel is supplied in operation and a cathode side to which an oxidizing agent is supplied in operation and comprising at least one fuel cell, each said fuel cell having an anode, a cathode and a membrane separating said cathode from said anode, said method comprising a first test comprising at least one of the following tests:
  a) to test whether said fuel cell system is gas-tight at said anode side and/or at said cathode side,
  b) to test whether a leakage is present between said anode side and said cathode side,
  c) to test a starting behaviour of said fuel cell system, or
  d) to test an operation of said fuel cell system at low current yield,
    said first test being carried out with a mixture of at least one inert gas with a fuel permissible for the operation of said fuel cell system, said mixture being supplied to said anode side of said fuel cell system and the amount of fuel in the mixture being predetermined such that a proportion of said fuel present in said mixture lies below a value at which said mixture is flammable in air, and wherein said tests are conducted outside of a test chamber, wherein the mixture consists essentially of 95% $N_2$ and 5% $H_2$, wherein the inert gas comprises nitrogen and the fuel comprises hydrogen, and further comprising supplying said mixture comprising controlling the flow of hydrogen and nitrogen from separate sources.

31. A method as set forth in claim 7 carried out without a test chamber.

* * * * *